United States Patent
Widiger et al.

(10) Patent No.: US 10,685,168 B2
(45) Date of Patent: Jun. 16, 2020

(54) CAPACITANCE EXTRACTION FOR FLOATING METAL IN INTEGRATED CIRCUIT

(71) Applicant: International Business Machines Corporation, Armonk, NY (US)

(72) Inventors: David J. Widiger, Pflugerville, TX (US); Ronald D. Rose, Essex Junction, VT (US); Lewis W. Dewey, III, Wappingers Falls, NY (US); Harold E. Reindel, Williston, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/169,223

(22) Filed: Oct. 24, 2018

(65) Prior Publication Data

US 2020/0134129 A1    Apr. 30, 2020

(51) Int. Cl.
*G06F 30/30* (2020.01)
*G06F 17/50* (2006.01)
(Continued)

(52) U.S. Cl.
CPC ........ *G06F 30/398* (2020.01); *G06F 30/3312* (2020.01); *G06F 30/367* (2020.01);
(Continued)

(58) Field of Classification Search
CPC ..................... G06F 17/5031; G05F 17/5081
(Continued)

(56) References Cited

U.S. PATENT DOCUMENTS 5,831,870 A    11/1998  Folta et al.
6,185,722 B1 *  2/2001  Darden et al. ...... G06F 17/5018
                                                          716/115
(Continued)

FOREIGN PATENT DOCUMENTS

CN    102024083 A    4/2011
JP    2009182267 A   8/2009
KR    100608333 B1   8/2006

OTHER PUBLICATIONS

Batterywala et al., "A Statistical Method for Fast and Accurate Capacitance Extraction in the Presence of Floating Dummy Fills", 19th International Conference on VLSI Design, 2006, pp. 1-6.
(Continued)

*Primary Examiner* — Sun J Lin
(74) *Attorney, Agent, or Firm* — Cantor Colburn LLP; Erik Johnson

(57) ABSTRACT

A system and method to perform capacitance extraction involves defining a location of signal wires and floating metal of an integrated circuit design. The method includes designating one of the signal wires as a target wire, defining a first area within which first capacitances between the target wire and the floating metal and other signal wires are determined, defining a second area, within which second capacitances between floating metal within the first area and the floating metal and the other signal wires not within the first area are determined, and generating an intermediate capacitive network. The intermediate capacitive network includes the target wire, the floating metal, and the other signal wires within the second area, the first capacitances and the second capacitances. A capacitive network is generated from the intermediate capacitive network. The first capacitances and the second capacitances are used to generate third capacitance values of the capacitive network.

20 Claims, 6 Drawing Sheets

(51) Int. Cl.
*G06F 30/398* (2020.01)
*G06F 30/367* (2020.01)
*G06F 30/394* (2020.01)
*G06F 30/3312* (2020.01)
*G06F 119/06* (2020.01)
*G06F 119/10* (2020.01)

(52) U.S. Cl.
CPC ........ *G06F 30/394* (2020.01); *G06F 2119/06* (2020.01); *G06F 2119/10* (2020.01)

(58) Field of Classification Search
USPC .......................................... 716/110, 111, 115
See application file for complete search history.

(56) References Cited

U.S. PATENT DOCUMENTS

| | | |
|---|---|---|
| 6,243,653 B1 | 6/2001 | Findley |
| 7,350,167 B1 | 3/2008 | Lenahan |
| 7,865,851 B2 | 1/2011 | Gurney |
| 8,572,545 B1 | 10/2013 | Lenahan |
| 2007/0148794 A1 | 6/2007 | Cha et al. |
| 2007/0220459 A1 | 9/2007 | Gurney |
| 2013/0246992 A1 | 9/2013 | Elfadel et al. |
| 2015/0324511 A1 | 11/2015 | Nieuwoudt et al. |

OTHER PUBLICATIONS

Kim et al., "Simple and Accurate Models for Capacitance Considering Floating Metal Fill Insertion", IEEE Transactions on Very Large Scale Integration (VLSI) Systems, vol. 17, No. 8, Aug. 2009, pp. 1166-1170.

Kurokawa et al., "Efficient Capacitance Extraction Method for Interconnects with Dummy Fills", IEEE 2004 Custom Integration Circuits Conference, 2004, pp. 485-488.

Lee et al., "Analyzing the Effects of Floating Dummy-Fills: From Feature Scale Analysis to Full-Chip RC Extraction", International Electron Devices Meeting, Technical Digest (Cat No. 01CH37224), 2001, pp. 1-4.

Park et al., "An Exhaustive Method for Characterizing the Interconnect Capacitance Considering the Floating Dummy-Fills by Employig an Efficient Field Solving Algorithm", International Conference on Simulation Semiconductor Processes and Devices, (Cat. No. 00TH8502), 2000, pp. 98-101.

Yu et al., "Efficient 3-D Extraction of Interconnect Capacitance Considering Floating Metal Fills with Boundary Element Method", IEEE Transactions on Computer-Aided Design of Integrated Circuits and Systems, vol. 25, No. 1, Jan. 2006, pp. 12-18.

* cited by examiner

CAPACITANCE EXTRACTION FOR FLOATING METAL IN INTEGRATED CIRCUIT

BACKGROUND

The present invention relates to integrated circuit development, and more specifically, to capacitance extraction for floating metal in an integrated circuit.

Integrated circuit (i.e., chip) development involves a number of phases including logic design, logic synthesis, physical synthesis, routing, and manufacturing. Each of the phases can include multiple processes that can be performed iteratively. An electronic design automation (EDA) tool can be used to perform many of the processes such as processes that are part of the logic synthesis and physical synthesis phases. The physical synthesis phase includes identifying and placing components, such as gate logic, to implement the logic design. A netlist can be produced to indicate the interconnections among components. In the routing phase, the placement of wires that connect gates and other components in the netlist is defined, and in the manufacturing phase, the finalized design is provided for physical implementation of the chip. In addition to functional requirements, an integrated circuit must typically also meet timing and power constraints. To ensure that timing requirements are met, timing analysis can be performed at different phases and iteratively. Noise and power analysis can also be performed at different phases.

SUMMARY

Embodiments of the present invention are directed to systems and methods to perform capacitance extraction in integrated circuit development. The method includes defining a location of signal wires and floating metal within some or all of an integrated circuit design, designating one of the signal wires as a target wire, defining a first area within which first capacitances between the target wire and each of the floating metal and the other signal wires are determined, defining a second area, larger than and encompassing the first area, within which second capacitances between at least one of the floating metal within the first area and each of the floating metal and the other signal wires not within the first area are determined, and generating an intermediate capacitive network to extract capacitance from the floating metal. The intermediate capacitive network includes the target wire, the floating metal, and the other signal wires within the second area, including those in the first area, the first capacitances, and the second capacitances. The method also includes generating a capacitive network from the intermediate capacitive network. The floating metal in the intermediate capacitive network is removed leaving the target wire and the other signal wires in the second area, including those in the first area, and the first capacitances and the second capacitances are used to generate third capacitance values of the capacitive network. A finalized version of the integrated circuit design is provided for manufacture based on performing timing analysis or noise analysis using the capacitive network.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
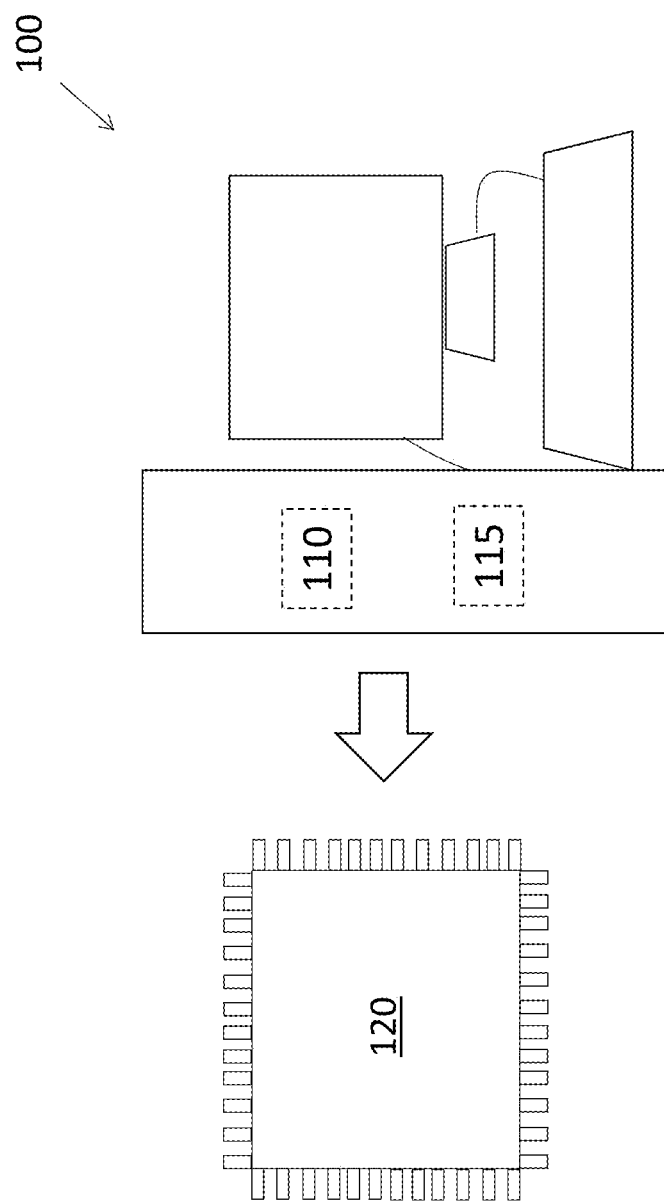
FIG. 1 is a block diagram of a system to perform capacitance extraction for floating metal in an integrated circuit according to one or more embodiments of the invention.

As previously noted, timing, noise, and power of an integrated circuit design can be analyzed at various phases of chip development to ensure that the physical implementation (i.e., the manufactured chip) meets all the requisite constraints for proper operation. The routing phase involves creating wires for the design that results from the placement process of physical synthesis. A goal of the routing phase is to locate and connect the wires in a way that does not cause manufacturing violations. Part of the iterative process of the routing phase involves ensuring that the wires not only meet manufacturing requirements but also meet timing, power, and electromigration or noise requirements. Capacitance values are important in performing both timing and noise analysis. Delay values that are used in timing analysis, for example, are influenced by capacitive coupling between conductors in close proximity to each other. Capacitive coupling is even more influential in noise analysis. Thus, one of the challenges to performing timing and noise analysis is properly accounting for all the capacitive coupling that the components of interest are subjected to. Capacitive coupling can occur among proximate signal wires and can also occur between a signal wire and floating metal. Floating metal is distinct from a signal wire because it does not carry electrical signals or power.

Floating metal can result in a number of ways. For example, in a self-aligned double patterning (SADP) manufacturing process, continuous wire shapes are modified using trim shapes and extents to form the nets (i.e., interconnects) among components (e.g., logic gates, buffers, latches) that are needed according to the integrated circuit design. Trim shapes define the location of cuts or discontinuities in the initially continuous wires, and extents are extensions from the actual wire portions to the trim shapes and, thus, are floating metal. Floating metal can also result from metal fill that is added for physical integrity of the integrated circuit. For example, a chemical mechanical planarization (CMP) process achieves better results when there is sufficient metal. Thus, metal fill, which is then floating metal, can be added prior to a CMP process. A given portion of an integrated circuit design can have a large number of floating metal elements. Thus, treating the floating metal in the same way as signal wires for purposes of timing and noise analysis is impractical. Instead, a capacitive network is used for noise or timing analysis. The capacitive network includes signal wires indicated as nodes with capacitors indicating capacitive coupling among the nodes. Obtaining the values of the capacitors in the capacitive network such that they accurately reflect the influence of the floating metal is a challenge.

Prior approaches to addressing floating shapes have included assuming that the floating metal is grounded. This results in unnecessarily large capacitance values and prevents the detection of potential noise issues. It can also result in too pessimistic a result. Another prior approach has involved ignoring floating metal. This can result in too optimistic a result and also potentially prevent detection of noise issues. An approach includes assuming that the floating metal is grounded but derating the capacitance values. This approach inserts uncertainty into the analysis that is performed with the capacitive network and can also potentially prevent detection of noise issues. A computationally intensive prior approach includes deriving capacitive coupling among signal wires through floating metal. This approach, while accurate, can be impractical in the time and computational resources needed to perform a separate analysis for every neighboring pair of signal wires, even when the same floating metal is involved in different cases.

Embodiments of the systems and methods detailed herein relate to capacitance extraction for floating metal in an integrated circuit. As detailed, an intermediate capacitive network is generated by considering the floating metal as nodes, like the signal wires. This intermediate capacitive network facilitates the efficient generation of the capacitive network with only signal wires as nodes that are used for noise and timing analysis. The capacitive effect of floating metal (referred to as floating shapes) is determined and stored. For any floating shapes within a region of influence of a signal wire of interest (referred to as the target shape), their stored capacitance is considered along with capacitance of other signal wires within the region of influence (referred to as neighbor shapes). In this way, obtaining the intermediate capacitive network can be simplified. Then, the floating shapes can be eliminated while accounting for the capacitive effect of the floating shapes to generate the capacitive network.

FIG. 1 is a block diagram of a system 100 to perform capacitance extraction for floating metal in an integrated circuit according to one or more embodiments of the invention. The system 100 includes processing circuitry 110 and memory 115 that is used to generate the design that is ultimately fabricated into an integrated circuit 120. The steps involved in the fabrication of the integrated circuit 120 are briefly described herein and with reference to FIG. 6. The physical layout is finalized, in part, based on the boundary assertion-based power recovery according to embodiments of the invention. The finalized physical layout is provided to a foundry. Masks are generated for each layer of the integrated circuit 120 based on the finalized physical layout. Then, the wafer is processed in the sequence of the mask order. The processing includes photolithography and etch. The fabrication is further discussed with reference to FIG. 6.

Figure 2:
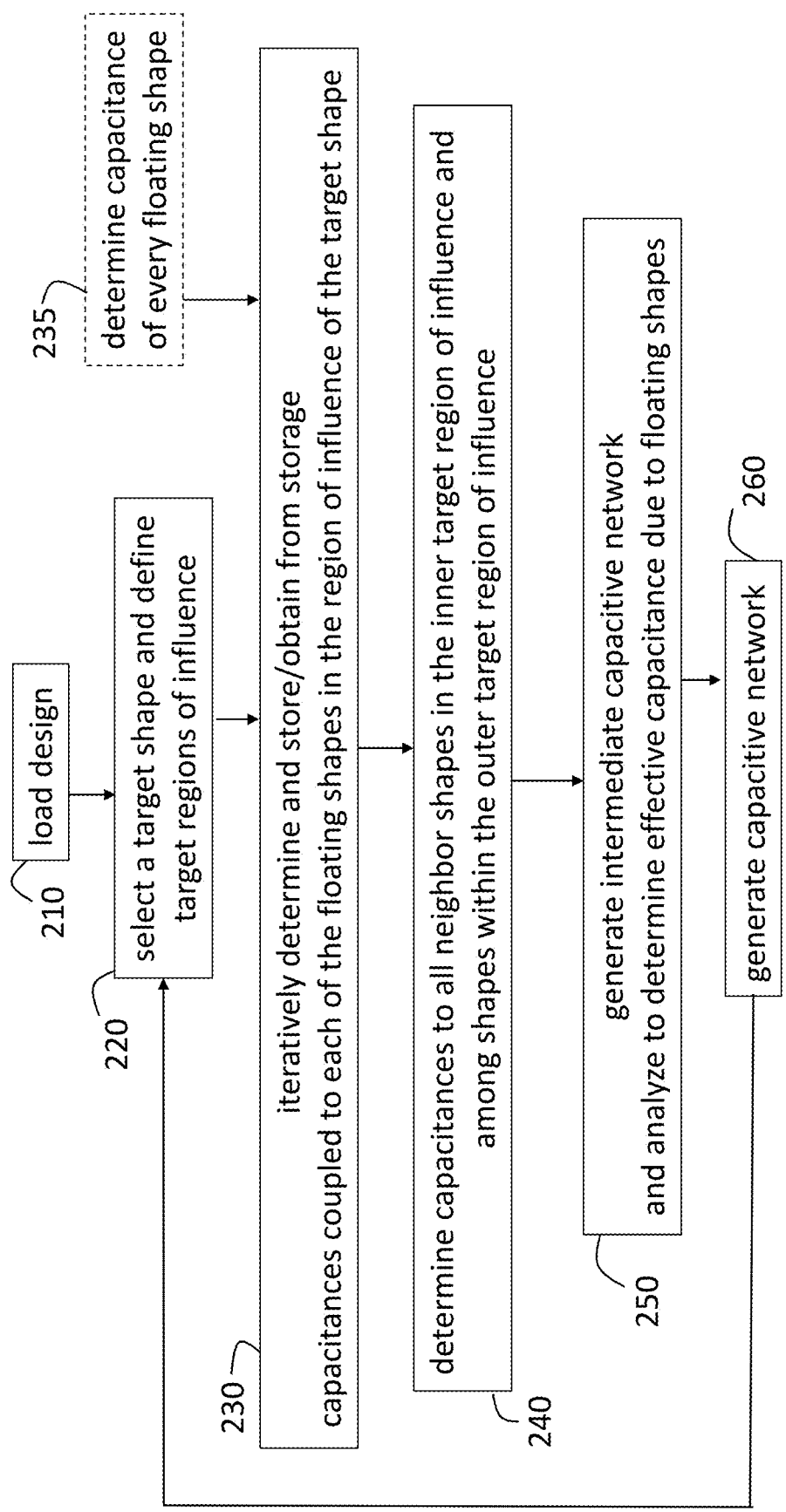
FIG. 2 is a process flow of a method to perform capacitance extraction for floating metal according to one or more embodiments of the invention.

FIG. 2 is a process flow of a method to perform capacitance extraction for floating metal according to one or more embodiments of the invention. The complete integrated circuit design can be subdivided into different hierarchical levels (e.g., cores that include units that each include macros). In addition, multiple metal levels can be part of a given hierarchical level. Loading the design, at block 210, can be at any hierarchical level 300 (FIG. 3) at which analysis is being performed. Loading the design refers to specifying the locations of the signal wires and the floating metal. At block 220, selecting a target shape 310 and defining target regions of influence includes selecting one of the signal wires in the design at each iteration and specifying a predefined area around the target shape 310, with the target shape 310 at the center, as the inner target region of influence 315.

As discussed with reference to FIG. 3, there will be a capacitance value directly between any floating shapes 320 or neighbor shapes 330 within this inner target region of influence 315 and the target shape 310. Defining target regions of influence, at block 220, also includes defining an outer target region of influence 317, which is further discussed with reference to FIG. 3.

At block 230, the processes include iteratively determining and storing, or obtaining from storage, capacitances from each of the floating shapes 320 in the inner target region of influence 315 of the target shape 310 to the target shape 310 and to any other shape (floating shape 320 or neighbor shape 330) within the corresponding floating region of influence 325. Capacitance value can be determined in a number of known ways. For example, a field solver approach can involve applying 1 volt to the metal of interest (e.g., a floating shape 320) and 0 volts to other metal (e.g., other floating shapes 320, the target shape 310) represented as a grid of discretized points and observing the charge introduced on the other metal. Another exemplary approach is a floating random walk solver which involves spatial sampling. Additional capacitance solving methods can involve a table lookup based on the position of the metal in its environment or a pattern matching approach in which capacitance results are imported from pre-analyzed results for similar wiring patterns. Interpolation or parameter-fitted heuristic equations can be used to refine any of the approaches.

Ideally, the capacitance to a given piece of metal from another piece of metal is the same as the capacitance from the other piece of metal to the given piece of metal. That is, capacitance to floating shape 320 and capacitance from floating shape 320 can generally be stated interchangeably. However, in reality, there can be slight variations in those two capacitance values. Thus, for example, after capacitance from floating shape 320a to target shape 310 is determined as part of the process at block 230 or 235, capacitance from the target shape 310 to the floating shape 320a can be determined prior to generating the intermediate capacitive network 400 according to one or more embodiments of the invention.

According to an exemplary embodiment, each floating shape 320 within the inner target region of influence 315 of the selected target shape 310 is processed if it is encountered for the first time, and the determined capacitance is stored so that the stored value can be used the next time the same floating shape 320 is encountered. According to another exemplary embodiment, the iterative determination of capacitance is performed, at optional block 235, for all floating shapes 320 in the design (loaded at block 210) prior to any processing of target shapes 310. In that case, the capacitance values can be obtained from storage and used for each floating shape 320 involved in the processing of each target shape 310. Determining capacitance from a given floating shape 320 involves examining a floating region of influence 325 of the floating shape 320 and determining the capacitance from the floating shape 320 to the target shape 310 and any neighbor shapes 330 or other floating shapes 320 within the floating region of influence 325 based on coupling effects. This is further discussed with reference to FIG. 3.

At block 240, the processes include determining the capacitance to all neighbor shapes 330 in the inner target region of influence 315 and among shapes within the outer target region of influence 317, as further discussed with reference to FIG. 3. At block 250, the processes include generating an intermediate capacitive network 400 (FIG. 4) and analyzing to determine effective capacitance due to the floating shapes 320 at the target shape 310. According to one or more embodiments, noise or timing analysis can be performed on this intermediate capacitive network 400. This results in generating the capacitive network 500 (FIG. 5), at block 260. As FIG. 2 indicates, the processes at blocks 220 through 260 (with the exception of the process at block 235) are performed by treating a different signal wire in the design (loaded at block 210) as a target shape 310 at each iteration. That is, an intermediate capacitive network 400 and capacitive network 500 are generated for each signal wire that is treated as a target shape 310.

One of the efficiencies, according to one or more embodiments of the invention, is that the process at block 235 need not be repeated in another iteration with a different target shape 310. This is because, once the floating shapes 320 are analyzed and their associated capacitance values are stored, the stored values can be used and the analysis need not be repeated. In addition, previously processed floating shapes 320, even according to the process at block 230, need not be re-analyzed. As previously noted, a capacitive network 500 can be used to perform timing or noise analysis according to known techniques. According to one or more embodiments of the invention, generating the intermediate capacitive network 400, at block 250, facilitates efficiently and accurately addressing the floating shapes 320 that are not included in the capacitive network 500 by determining their influence on the capacitance values used in the capacitive network 500.

Figure 3:
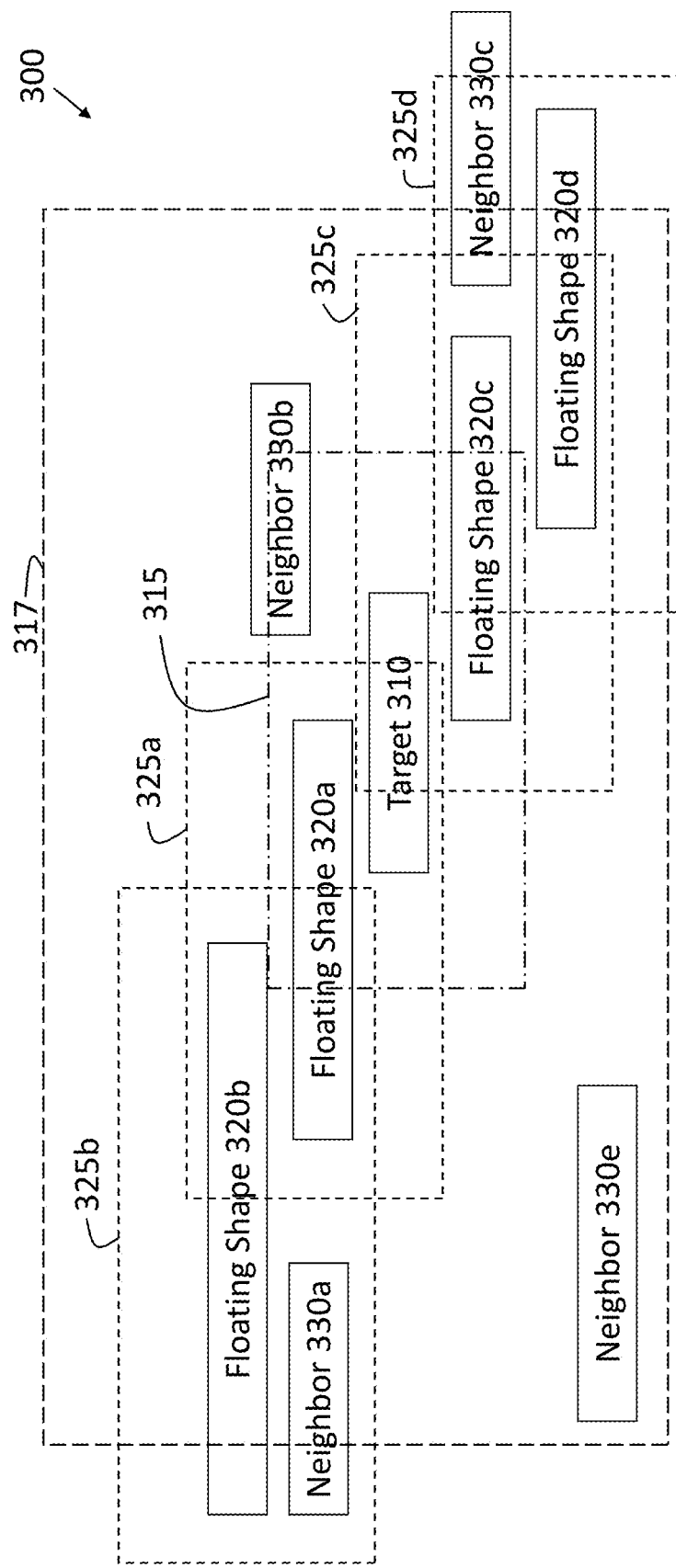
FIG. 3 depicts an exemplary hierarchical level of an integrated circuit that is used to further discuss the processes for capacitance extraction for floating metal according to one or more embodiments of the invention.

FIG. 3 depicts an exemplary hierarchical level 300 of an integrated circuit that is used to further discuss the processes for capacitance extraction for floating metal according to one or more embodiments of the invention. As previously noted, the hierarchical level 300 can represent the entire integrated circuit or any subset. FIG. 3 shows a signal wire selected as the target shape 310 (at block 220), floating metal indicated as floating shapes 320*a*, 320*b*, 320*c*, and 320*d* (generally referred to as 320), and other signal wires indicated as neighbor shapes 330*a*, 330*b*, 330*c*, 330*d*, and 330*e* (generally referred to as 330). An inner target region of influence 315 and an outer target region of influence 317 are shown around the target shape 310, and floating regions of influence 325*a*, 325*b*, 325*c*, and 325*d* (generally referred to as 325) are shown around corresponding floating shapes 320. Floating shapes 320 in a metal level above or below the metal level of the target shape 310 can also be considered according to the processes discussed with reference to FIG. 2. The floating shapes 320 in metal levels other than the metal level of the target shape 310 can be crossing floating shapes (i.e., perpendicular to the target shape 310).

As FIG. 3 indicates, every signal wire and floating metal is not the same size. For example, the floating shape 320*b* is shown as being longer than the floating shape 320*a*. As a result, the inner target region of influence 315 and each of the floating regions of influence 325 are not the same size. The area encompassed by the inner target region of influence 315, the outer target region of influence 317, and each of the floating regions of influence 325 can be predetermined based on simulations or a test circuit to ensure that a desired level of capacitive coupling is captured and beyond which capacitive couple effects are negligible. The size of the area is determined based on a tradeoff between larger area and increased time and resource cost for the analysis. This tradeoff is made less severe because capacitive analysis of each floating shape 320 is stored (at block 230 or 235) according to one or more embodiments of the invention such that re-analysis of floating shapes 320 within regions of influence is not required.

Rules of thumb (e.g., 10 times the wire spacing of the metal level above or below or 5 times the minimum wires width at the metal level being analyzed) can be used to determine the sizes of the areas of influence. A vertical region of influence must also be considered. That is, wires one metal level above or below or two metal levels above or below represent smaller or larger vertical regions of influence. For example, the inner target region of influence 315 defines an area beyond which components (e.g., neighbor shape 330*a*) have negligible levels of capacitive coupling with the target shape 310. Components that are even partially within the inner target region of influence 315, the outer target region of influence 317, or one of the floating regions of influence 325 must be considered with respect to capacitive coupling as further discussed.

As FIG. 3 indicates, floating shape 320*a* and floating shape 320*c* are partially within the inner target region of influence 315. Thus, according to an exemplary embodiment of the invention, at block 230, the capacitance from floating shape 320*a* and from floating shape 320*c* is determined and stored (or used from storage) during the iteration in which target shape 310 is being considered. According to another exemplary embodiment of the invention, at block 235, the capacitances from floating shapes 320*a*, 320*b*, 320*c*, and 320*d* are determined and stored before target shape 310 is even considered. To determine the capacitances from floating shapes 320*a* and 320*c*, the floating regions of influence 325*a* and 325*c* are considered. The floating region of influence 325*a* includes, at least in part, floating shape 320*b* and target shape 310, and the floating region of influence 325*c* includes, at least in part, the target shape 310, the floating shape 320*d*, and the neighbor shape 330*c*.

As previously noted, a field solver approach or other technique can be used to determine the capacitance values. As also previously noted, capacitance from floating shape 320*a* (or floating shape 320*c*) to target shape 310 can be slightly different than the capacitance from target shape 310 to floating shape 320*a* (or floating shape 320*c*). Thus, prior to deriving the intermediate capacitive network 400 or the capacitive network 500, the capacitance from target shape 310 to the floating shape 320*a* and to the floating shape 320*c* can be determined according to one or more embodiments of the invention. Based on the process at block 240, the capacitance from the target shape 310 to the neighbor shape 330*b*, which is in the inner target region of influence 315 is also determined.

The significance of the outer target region of influence 317 is that it provides an outer bound to the intermediate capacitive network 400 that is generated at block 250. That is, the inner target region of influence 315 defines the shapes to which there is a direct capacitance from the target shape 310. For shapes between the inner target region of influence 315 and the outer target region of influence 317, the capacitive connection with the target shape 310 is not direct. For example, floating shape 320*b* is not within the inner target region of influence 315 and, thus, does not have a direct capacitive connection with the target shape 310. However, floating shape 320b is partially within the floating region of influence 325a of floating shape 320a, which is within the inner target region of influence 315. Thus, whether it is within the outer target region of influence 317 or not, the capacitance from floating shape 320a to floating shape 320b could be included in the intermediate capacitive network 400.

As another example, neighbor shape 330a is not within the inner target region of influence 315 and, thus, has no direct connection with the target shape 310. Neighbor shape 330a is also not within the floating region of influence 325a of floating shape 320a, which is within the inner target region of influence 315. Thus, neighbor shape 330a has no connection with floating shape 320a either. However, because neighbor shape 330a is within the outer target region of influence 317, its connection with floating shape 320b, whose floating region of influence 325b the neighbor shape 330a is within, will be part of the intermediate capacitive network 400. Once neighbor shape 330a is part of the intermediate capacitive network 400, it will be part of the capacitive network 500, because only floating shapes 320 are eliminated from the intermediate capacitive network 400 to generate the capacitive network 500.

For explanatory purposes, neighbor shapes 330d and 330e are also discussed. Neighbor shape 330d is outside the outer target region of influence 317 and is not within the floating region of influence 325 of any floating shape within the outer target region of influence 317. Thus, neighbor shape 330d is not part of the intermediate capacitive network 400 for the exemplary target shape 310 shown in FIG. 3. While neighbor shape 330e is within the outer target region of influence 317, it is not within the floating region of influence 325 of any floating shape 320 inside the outer target region of influence 317. Thus, neighbor shape 330e is also not part of the intermediate capacitive network 400.

As previously noted, the use of the outer target region of influence 317 is a way to set an outer bound on what is included in the intermediate capacitive network 400 according to an exemplary embodiment of the invention. Other ways of determining this bound are also contemplated. According to one exemplary alternate embodiment of the invention, the outer target region of influence 317 can be eliminated, but the inner target region of influence 315 can be made to encompass a larger area. Then all neighbor shapes 330 and floating shapes 320 within that expanded inner target region of influence 315 can have direct connections with the target shape 310 and additional shapes within the floating regions of influence 325 associated with those floating shapes 320 could also be included in the intermediate capacitive network 400 with connections to the respective floating shapes 320.

According to another exemplary alternate embodiment of the invention, tiers of target regions of influence can be used. For example, the first tier, like the inner target region of influence 315 defines the floating shapes 320 and neighbor shapes 330 with direct capacitance connections to the target shape 310. Floating shapes 320 in the next tier would connect with floating shapes 320 in the first tier and with neighbor shapes 330 in the next tier and so on for a specified number of tiers. The number of tiers can be a user-defined value, for example. According to additional alternate embodiments of the invention, combinations of approaches can be used. For example, the tiers may be used up to an outer target region of influence 317. As another example, weighting may be used with the tiers. The weighting can be based on the magnitude of the capacitance to the target shape 310.

Figure 4:
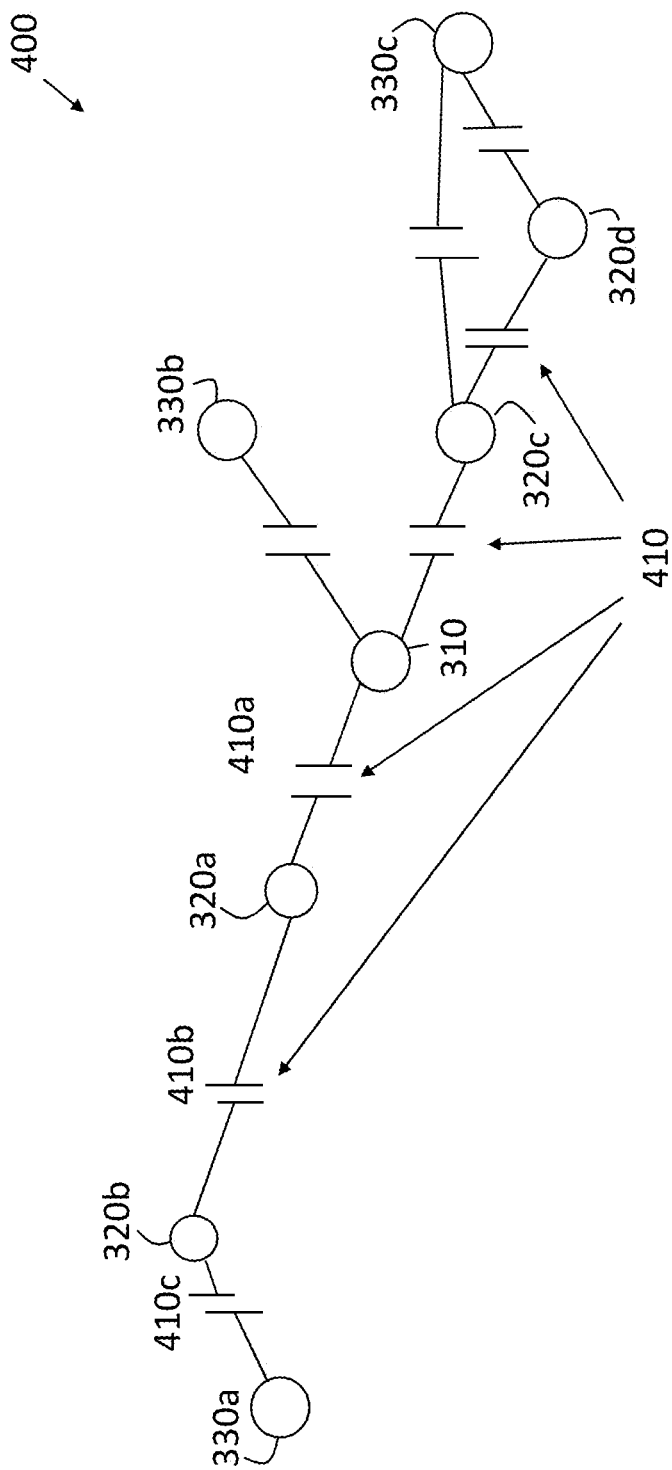
FIG. 4 shows an exemplary intermediate capacitive network that results from a selected target shape according to one or more embodiments of the invention.

FIG. 4 shows an exemplary intermediate capacitive network 400 that results for the target shape 310 shown in FIG. 3 according to one or more embodiments of the invention. Capacitances 410 between shapes are indicated. Three of the capacitances 410a, 410b, and 410c are additionally labeled for use in the discussion with reference to FIG. 5. As FIG. 4 makes clear, only the floating shapes 320a and 320c and neighbor shape 330b, which are all at least partially within the inner target region of influence 315 have capacitances 410 that connect them directly with the target shape 310. Other capacitances 410 shown in FIG. 4 result from floating regions of influence 325 within the outer target region of influence 317, as discussed with reference to FIG. 3. As previously noted, the processes discussed with reference to FIG. 2 (with the exception of the process at block 235) can be repeated for another signal wire selected as the target shape 310.

Figure 5:
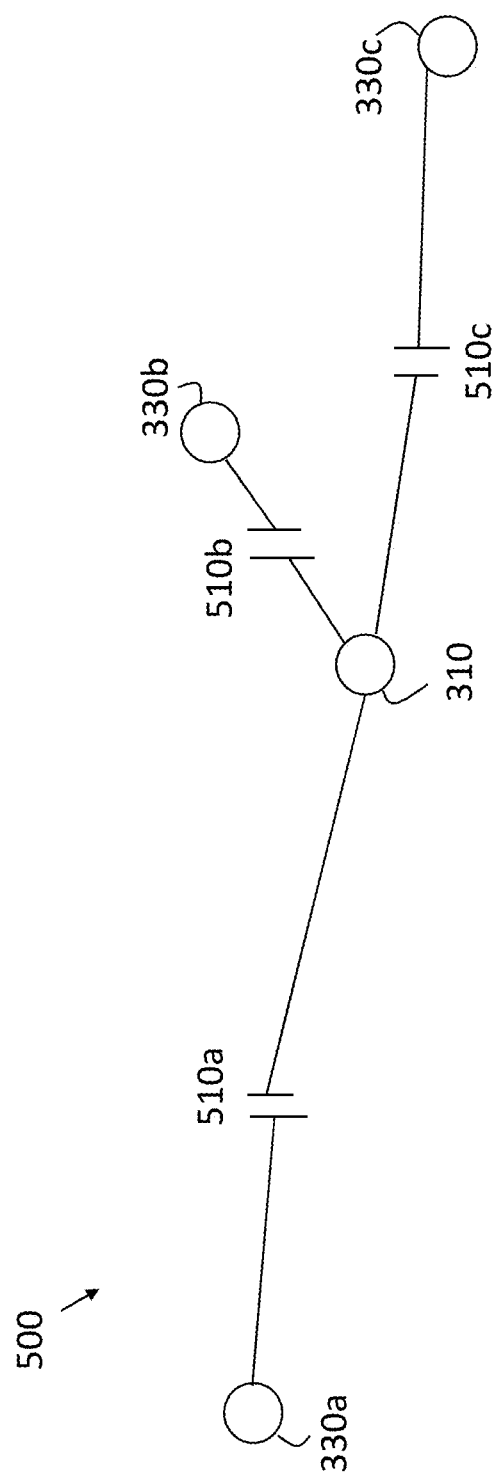
FIG. 5 is an exemplary capacitive network that results from the capacitance extraction for floating metal according to one or more embodiments of the invention.

FIG. 5 is an exemplary capacitive network 500 that results from the capacitance extraction for floating metal according to one or more embodiments of the invention. The exemplary capacitive network 500 is derived from the exemplary intermediate capacitive network 400 shown in FIG. 4. As FIG. 5 indicates, the floating shapes 320 are eliminated in the capacitive network 500. However, the capacitances 410 determined to generate the intermediate capacitive network 400 are used to determine the capacitance values 510a, 510b, 510c (referred to generally as 510). Thus, the capacitance values 510 between the target shape 310 and neighbor shapes 330 included in FIG. 5 account for capacitive coupling with floating shapes 320. Derivation of the capacitance values 510 in the capacitive network 500 can be according to any known circuit reduction technique. For example, a resistive analysis can be performed by mapping capacitance values in the intermediate capacitive network 400 to resistance values and charges to current values. As another example, Kirchoff's laws can be applied. In a simple case, a series capacitor rule can be used to determine, for example, capacitance 510a as $1/(1/410a+1/410b+1/410c)$. As previously noted, while use of the intermediate capacitive network 400 to derive the capacitive network 500 is more efficient and more accurate than prior approaches to generating the capacitive network 500, the use of the capacitive network 500 in timing analysis and noise analysis is well-known and is not detailed herein.

Figure 6:
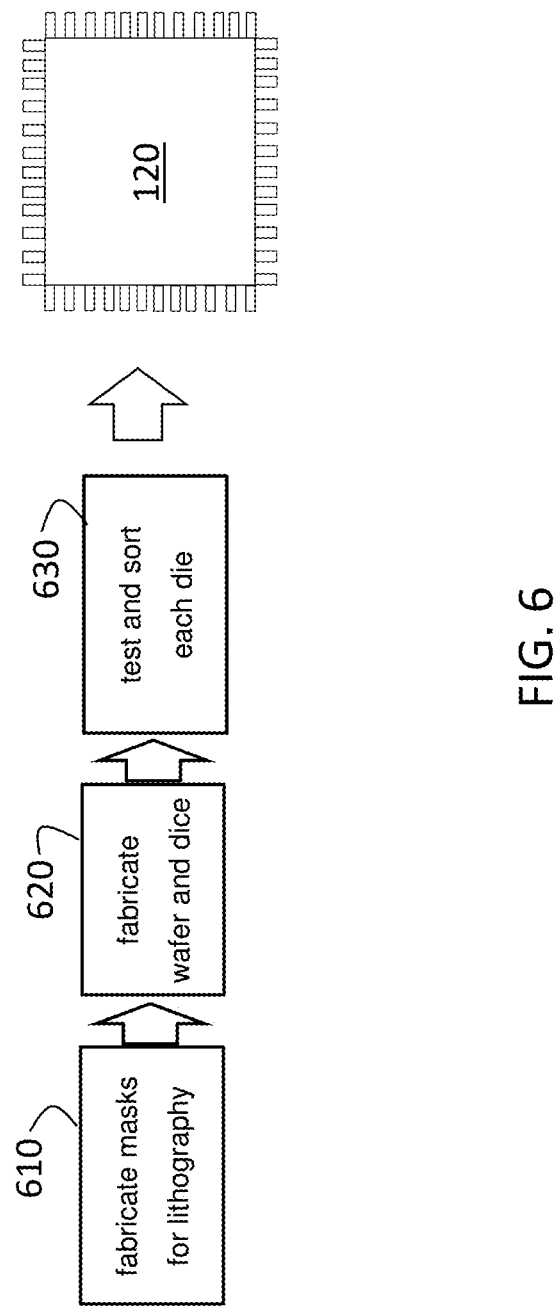
FIG. 6 is a process flow of a method of fabricating the integrated circuit designed according to one or more embodiments of the invention.

FIG. 6 is a process flow of a method of fabricating the integrated circuit 120 designed according to one or more embodiments of the invention. Once the physical synthesis phase and other phases are completed, based, in part, on the timing and noise analysis that uses capacitance extraction for floating metal according to one or more embodiments of the invention (i.e., the capacitive network 500 obtained from the intermediate capacitive network 400), the processes shown in FIG. 6 can be performed to fabricate the integrated circuit 120. Generally, a wafer with multiple copies of the final design is fabricated and cut (i.e., diced) such that each die is one copy of the integrated circuit 120. At block 610, the processes include fabricating masks for lithography based on the finalized physical layout. At block 620, fabricating the wafer includes using the masks to perform photolithography and etching. Once the wafer is diced, testing and sorting each die is performed, at block 630, to filter out any faulty die.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing capacitance extraction in integrated circuit development, the method comprising:
   defining a location of signal wires and floating metal within some or all of an integrated circuit design;
   designating one of the signal wires as a target wire;
   defining a first area within which first capacitances between the target wire and each of the floating metal and the other signal wires are determined;
   defining a second area, larger than and encompassing the first area, within which second capacitances between at least one of the floating metal within the first area and each of the floating metal and the other signal wires not within the first area are determined;
   generating an intermediate capacitive network to extract capacitance from the floating metal, wherein the intermediate capacitive network includes the target wire, the floating metal and the other signal wires within the second area, including those in the first area, the first capacitances and the second capacitances;
   generating a capacitive network from the intermediate capacitive network, wherein the floating metal in the intermediate capacitive network is removed leaving the target wire and the other signal wires in the second area, including those in the first area, and the first capacitances and the second capacitances are used to generate third capacitance values of the capacitive network; and
   providing a finalized version of the integrated circuit design for manufacture based on results obtained in performing timing analysis or noise analysis using the capacitive network.

2. The computer-implemented method according to claim 1, further comprising determining which of the floating metal in the first area is connected by one of the second capacitances to the floating metal or the other signal wire outside the first area and within the second area by defining a floating area corresponding with each metal in the first area around the floating metal and identifying the floating metal and the other signal wires within the floating area.

3. The computer-implemented method according to claim 1, further comprising storing all of the first capacitances and the second capacitances connected to any of the floating metal.

4. The computer-implemented method according to claim 3, further comprising obtaining any of the first capacitances or the second capacitances that are stored rather than determining them again.

5. The computer-implemented method according to claim 1, further comprising determining and storing all capacitance values connected to all the floating metal as stored capacitance values.

6. The computer-implemented method according to claim 5, wherein the determining one of the first capacitances or one of the second capacitances connected to one of the floating metal includes obtaining the corresponding stored capacitance value.

7. The computer-implemented method according to claim 1, further comprising iteratively generating the capacitive network with a different one of the signal wires designated as the target wire.

8. A system to perform capacitance extraction in integrated circuit development, the system comprising:
   a memory device configured to store a location of signal wires and floating metal within some or all of an integrated circuit design; and
   a processor configured to designate one of the signal wires as a target wire, to define a first area within which first capacitances between the target wire and each of the floating metal and the other signal wires are determined, to define a second area, larger than and encompassing the first area, within which second capacitances between at least one of the floating metal within the first area and each of the floating metal and the other signal wires not within the first area are determined, to generate an intermediate capacitive network to extract capacitance from the floating metal, wherein the intermediate capacitive network includes the target wire, the floating metal and the other signal wires within the second area, including those in the first area, the first capacitances and the second capacitances, and to generate a capacitive network from the intermediate capacitive network, wherein the floating metal in the intermediate capacitive network is removed leaving the target wire and the other signal wires in the second area, including those in the first area, and the first capacitances and the second capacitances are used to generate third capacitance values of the capacitive network, and a finalized version of the integrated circuit design is provided for manufacture based on results obtained in performing timing analysis or noise analysis using the capacitive network.

9. The system according to claim 8, wherein the processor is further configured to determine which of the floating metal in the first area is connected by one of the second capacitances to the floating metal or the other signal wire outside the first area and within the second area by defining a floating area corresponding with each metal in the first area around the floating metal and identifying the floating metal and the other signal wires within the floating area.

10. The system according to claim 8, wherein the processor is further configured to store all of the first capacitances and the second capacitances connected to any of the floating metal.

11. The system according to claim 10, wherein the processor is further configured to obtain any of the first capacitances or the second capacitances that are stored rather than determining them again.

12. The system according to claim 8, wherein the processor is further configured to determine and store all capacitance values connected to all the floating metal as stored capacitance values.

13. The system according to claim 12, wherein the processor determines one of the first capacitances or one of the second capacitances connected to one of the floating metal by obtaining the corresponding stored capacitance value.

14. The system according to claim 8, wherein the processor is further configured to iteratively generate the capacitive network with a different one of the signal wires designated as the target wire.

15. A computer program product for performing capacitance extraction in integrated circuit development, the computer program product comprising a non-transitory computer readable storage medium having program instructions embodied therewith, the program instructions executable by a processor to perform a method comprising:
   defining a location of signal wires and floating metal within some or all of an integrated circuit design;
   designating one of the signal wires as a target wire;
   defining a first area within which first capacitances between the target wire and each of the floating metal and the other signal wires are determined;
   defining a second area, larger than and encompassing the first area, within which second capacitances between at least one of the floating metal within the first area and each of the floating metal and the other signal wires not within the first area are determined;
   generating an intermediate capacitive network to extract capacitance from the floating metal, wherein the intermediate capacitive network includes the target wire, the floating metal and the other signal wires within the second area, including those in the first area, the first capacitances and the second capacitances;
   generating a capacitive network from the intermediate capacitive network, wherein the floating metal in the intermediate capacitive network is removed leaving the target wire and the other signal wires in the second area, including those in the first area, and the first capacitances and the second capacitances are used to generate third capacitance values of the capacitive network; and
   providing a finalized version of the integrated circuit design for manufacture based on results obtained in performing timing analysis or noise analysis using the capacitive network.

16. The computer program product according to claim 15, further comprising determining which of the floating metal in the first area is connected by one of the second capacitances to the floating metal or the other signal wire outside the first area and within the second area by defining a floating area corresponding with each metal in the first area around the floating metal and identifying the floating metal and the other signal wires within the floating area.

17. The computer program product according to claim 15, further comprising storing all of the first capacitances and the second capacitances connected to any of the floating metal.

18. The computer program product according to claim 17, further comprising obtaining any of the first capacitances or the second capacitances that are stored rather than determining them again.

19. The computer program product according to claim 15, further comprising determining and storing all capacitance values connected to all the floating metal as stored capacitance values, wherein the determining one of the first capacitances or one of the second capacitances connected to one of the floating metal includes obtaining the corresponding stored capacitance value.

20. The computer program product according to claim 15, further comprising iteratively generating the capacitive network with a different one of the signal wires designated as the target wire.

* * * * *